(12) United States Patent
Jiang et al.

(10) Patent No.: US 10,982,895 B2
(45) Date of Patent: Apr. 20, 2021

(54) REFRIGERATING AND FREEZING DEVICE (71) Applicant: QINGDAO HAIER JOINT STOCK CO., LTD., Qingdao (CN)

(72) Inventors: Bo Jiang, Qingdao (CN); Lei Wang, Qingdao (CN); Haoquan Liu, Qingdao (CN); Ruowu Xin, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 60 days.

(21) Appl. No.: 16/466,266

(22) PCT Filed: Dec. 1, 2017

(86) PCT No.: PCT/CN2017/114222
§ 371 (c)(1),
(2) Date: Jun. 3, 2019

(87) PCT Pub. No.: WO2018/099465
PCT Pub. Date: Jun. 7, 2018

(65) Prior Publication Data
US 2019/0301785 A1    Oct. 3, 2019

(30) Foreign Application Priority Data

Dec. 2, 2016 (CN) .......................... 201611097068.1

(51) Int. Cl.
*F25D 17/06* (2006.01)
*F25D 25/02* (2006.01)
(Continued)

(52) U.S. Cl.
CPC ............ *F25D 17/042* (2013.01); *F25D 11/02* (2013.01); *F25D 17/065* (2013.01); *F25D 21/04* (2013.01);
(Continued)

(58) Field of Classification Search
CPC ................. F25D 17/042; F25D 25/025; F25D 11/02–11/022; F25D 17/065; F25D 2317/04; A23B 7/148
See application file for complete search history.

(56) References Cited

U.S. PATENT DOCUMENTS

| 5,333,394 A * | 8/1994 | Herdeman | A23B 7/148 34/218 |
| 2014/0145579 A1* | 5/2014 | Anderson | F25D 29/005 312/404 |
| 2014/0290302 A1* | 10/2014 | Shin | F25D 25/025 62/408 |

FOREIGN PATENT DOCUMENTS

| CN | 101544356 A | 9/2009 |
| CN | 101766321 A | 7/2010 |

(Continued)

OTHER PUBLICATIONS

English translation of JPH05-227881A. (Year: 1992).*

*Primary Examiner* — Cassey D Bauer
(74) *Attorney, Agent, or Firm* — Cheng-Ju Chiang (57) ABSTRACT

Provided is a refrigerating and freezing device. The refrigerating and freezing device comprises a cabinet body with a first storage space defined therein, an oxygen-enriched membrane assembly and an air extraction device. A storage container in which an atmosphere-controlled freshness-keeping space is formed is disposed in the first storage space. The oxygen-enriched membrane assembly is provided with at least one oxygen-enriched membrane and an oxygen-enriched gas collection chamber. The air extraction device is communicated with the oxygen-enriched gas collection chamber through a pipeline to extract and discharge the gas that permeates into the oxygen-enriched gas collection chamber out of the storage container. The refrigerating and freezing device not only has good freshness-keeping (Continued)

performance, but also has relatively low requirements on the rigidity and strength of the storage container. Besides, it is small in size and low in noise, and it is suitable for household and individual use.

10 Claims, 4 Drawing Sheets

(51) Int. Cl.
 *F25D 17/04* (2006.01)
 *F25D 11/02* (2006.01)
 *F25D 21/04* (2006.01)
(52) U.S. Cl.
 CPC ........ *F25D 25/025* (2013.01); *F25D 2317/04* (2013.01)

(56) References Cited

FOREIGN PATENT DOCUMENTS

| | | |
|---|---|---|
| CN | 106679273 A | 5/2017 |
| CN | 206291581 U | 6/2017 |
| JP | H5-227881 A | 9/1993 |
| KR | 10-2012-0049565 A | 5/2012 |

\* cited by examiner

REFRIGERATING AND FREEZING DEVICE

CROSS-REFERENCE TO RELATED APPLICATION

The present application is a 35 U.S.C. § 371 National Phase conversion of International (PCT) Patent Application No. PCT/CN2017/114222, filed on Dec. 1, 2017, which claims the priority of Chinese Patent Application No. 201611097068.1, filed on Dec. 2, 2016, and entitled "Refrigerating and Freezing Device", the content of which is incorporated herein by reference in its entirety. The PCT International Patent Application was filed and published in Chinese.

TECHNICAL FIELD

The present invention relates to the technical field of article storage, and in particular to a refrigerating and freezing device.

BACKGROUND

A refrigerator is a refrigerating device that maintains a constant low temperature, and is also a civilian product that keeps food or other articles in a constant-low-temperature cold state. With the improvement of life quality, consumers demand more and more on freshness keeping of stored food, especially, the color, the taste, etc. of food. Thus, the stored food should be guaranteed to keep its color, taste, freshness, etc. unchanged as much as possible during storage. At present, there is only one method to better store food on the market, namely, vacuum freshness-keeping. Freshness keeping with a vacuum bag and freshness keeping with a vacuum storage compartment are frequently-used vacuum freshness-keeping manners.

When the vacuum bag is adopted for freshness keeping, the consumers need to perform vacuumizing every time they store food, and thus is not favored by the consumers due to the troublesome operation.

When the vacuum storage compartment is adopted for freshness keeping, since a refrigerator body, etc. are of rigid structures, to keep a vacuum state, the demands on a vacuumizing system and the sealing performance of the refrigerator are very high. Every time an article is taken and placed, a large quantity of new air floods in, leading to relatively high energy consumption. Besides, in a vacuum environment, it is relatively difficult in cold energy transmission, which is particularly unfavorable for food storage. Moreover, in the vacuum environment, it takes a lot of effort for a user to open a door of the refrigerator every time, causing inconvenience for the user to use it. Although the vacuum storage compartments of some refrigerators can be ventilated through vacuumizing systems, the user needs to wait for a relatively longer time, resulting in poor timeliness. In addition, a relatively longer vacuum time will also cause the refrigerator body, etc. of the refrigerator to be severely deformed. That is, a conventional refrigerator with a vacuumizing structure cannot well complete vacuum freshness-keeping, its requirements on the strength of the refrigerator body, etc. are very high, and thus the implementation requirement and cost are also high.

In addition, the inventor has discovered: since a traditional nitrogen generating device for atmosphere-controlled freshness-keeping is large in size and high in cost, this technology is basically limited to various large-scale special storehouses (their storage capacities are generally at least 30 tons above). So to speak, a technical problem that those skilled in the field of atmosphere-controlled freshness-keeping have been eager to solve but has not successfully solved is that what kind of appropriate gas-conditioning technology and corresponding device may be adopted to economically minimize and silence an atmosphere-controlled system to make it applicable to family or individual users.

SUMMARY

The present invention aims to overcome at least one defect of a conventional refrigerator by providing a refrigerating and freezing device and, creatively proposes that oxygen in air inside an atmosphere-controlled freshness-keeping space is discharged out of the space, such that a nitrogen-rich oxygen-lean gas atmosphere is obtained in the space to facilitate freshness keeping of food. In this gas atmosphere, aerobic respiration intensity of fruits and vegetables is reduced by reducing the content of oxygen in a fruit and vegetable storage space. Meanwhile, a basic respiration function is guaranteed to prevent the fruits and vegetables from anaerobic respiration. Thus, the fruits and vegetables are kept fresh for a long time.

For this purpose, the present invention provides a refrigerating and freezing device, including:

a cabinet body with a first storage space defined therein, wherein a storage container in which an atmosphere-controlled freshness-keeping space is formed is disposed in the first storage space;

an oxygen-enriched membrane assembly having at least one oxygen-enriched membrane and an oxygen-enriched gas collection chamber, wherein the space around the oxygen-enriched membrane assembly is communicated with the atmosphere-controlled freshness-keeping space, and the oxygen-enriched membrane assembly is configured such that more of oxygen than nitrogen in airflow in the space around the oxygen-enriched membrane assembly enters the oxygen-enriched gas collection chamber through the oxygen-enriched membrane; and an air extractor communicated with the oxygen-enriched gas collection chamber through a pipeline to extract and discharge the gas that permeates into the oxygen-enriched gas collection chamber out of the storage container.

Optionally, the storage container is a drawer assembly, including:

a barrel disposed in the first storage space; and a drawer slidably mounted in the barrel to be operatively withdrawn from and inserted into the barrel from a forward opening of the barrel.

Optionally, a receiving chamber communicated with the atmosphere-controlled freshness-keeping space is formed in a top wall of the barrel. The oxygen-enriched membrane assembly is disposed in the receiving chamber.

Optionally, at least one first vent and at least one second vent spaced from the at least one first vent are formed in a wall surface, between the receiving chamber and the atmosphere-controlled freshness-keeping space, of the top wall to respectively communicate the receiving chamber with the atmosphere-controlled freshness-keeping space in different positions.

The refrigerating and freezing device further includes a fan. The fan is disposed in the receiving chamber to enable the gas in the atmosphere-controlled freshness-keeping space to sequentially pass through the at least one first vent, the receiving chamber and the at least one second vent and then to return to the atmosphere-controlled freshness-keeping space.

Optionally, the fan is a centrifugal fan disposed above the at least one first vent. A rotation axis of the centrifugal fan is vertically downward.

The oxygen-enriched membrane assembly is disposed above the at least one second vent. Each oxygen-enriched membrane of the oxygen-enriched membrane assembly is parallel to the top wall.

Optionally, the at least one first vent is formed in the front portion of the top wall of the barrel. The at least one second vent is formed in the rear portion of the top wall of the barrel.

Optionally, the oxygen-enriched membrane assembly further includes a support frame. The support frame is provided with a first surface and a second surface which are parallel to each other. A plurality of airflow channels which respectively extends on the first surface and the second surface and runs through the support frame to communicate the first surface with the second surface is formed on the support frame. The plurality of airflow channels together forms the oxygen-enriched gas collection chamber The at least one oxygen-enriched membrane includes two planar oxygen-enriched membranes which are respectively laid on the first surface and the second surface of the support frame.

Optionally, the air extractor includes a mounting baseplate and a sealed box mounted on the mounting baseplate, as well as an air pump disposed in the sealed box. An extraction opening of the air pump is communicated with an exhaust opening of the oxygen-enriched gas collection chamber through the pipeline.

Optionally, a second storage space and at least one third storage space are further defined in the cabinet body.

The second storage space is disposed below the first storage space. The at least one third storage space is disposed between the first storage space and the second storage space.

Optionally, the first storage space is a refrigerating chamber.

The second storage space is a freezing chamber.

The third storage space is a variable-temperature chamber. There are two third storage spaces which are flush with each other in a horizontal direction.

According to the refrigerating and freezing device provided by the present invention, since the oxygen-enriched membrane assembly and the air extractor are provided, and the air extractor enables pressure on one side of the oxygen-enriched membrane to be lower than that on the other side, the nitrogen-rich oxygen-lean gas atmosphere may be formed in the atmosphere-controlled freshness-keeping space to facilitate freshness keeping of food. In this gas atmosphere, aerobic respiration intensity of fruits and vegetables is reduced by reducing the content of oxygen in a fruit and vegetable storage space. Meanwhile, a basic respiration function is guaranteed to prevent the fruits and vegetables from anaerobic respiration. Thus, the fruits and vegetables are kept fresh for a long time.

Further, the refrigerating and freezing device not only has an excellent freshness-keeping effect, but also demands less on the rigidity and strength of the storage container, and is very low in implementation demand and cost. Besides, the refrigerating and freezing device well solves the technical problem that those skilled in the field of atmosphere-controlled freshness-keeping have been eager to solve but has not successfully solved. The refrigerating and freezing device provided by the present invention is not only small in size but also low in noise, and therefore, is particularly suitable for family and individual use.

Further, the refrigerating and freezing device is preferably a household refrigerator, e.g., a household compression-type direct-cooling refrigerator, a household compression-type air-cooling refrigerator and a semiconductor refrigerator.

Through the following detailed description of the specific embodiments of the present invention with reference to the drawings, those skilled in the field will understand the above and other objectives, advantages and features of the present invention more clearly.

BRIEF DESCRIPTION OF THE DRAWINGS

The followings will describe some specific embodiments of the present invention in detail in an exemplary rather than restrictive manner with reference to the accompanying drawings. The same reference signs in the drawings represent the same or similar components or parts. Those skilled in the art shall understand that these drawings may not be necessarily drawn to scale. In the drawings.

DETAILED DESCRIPTION

Figure 1:
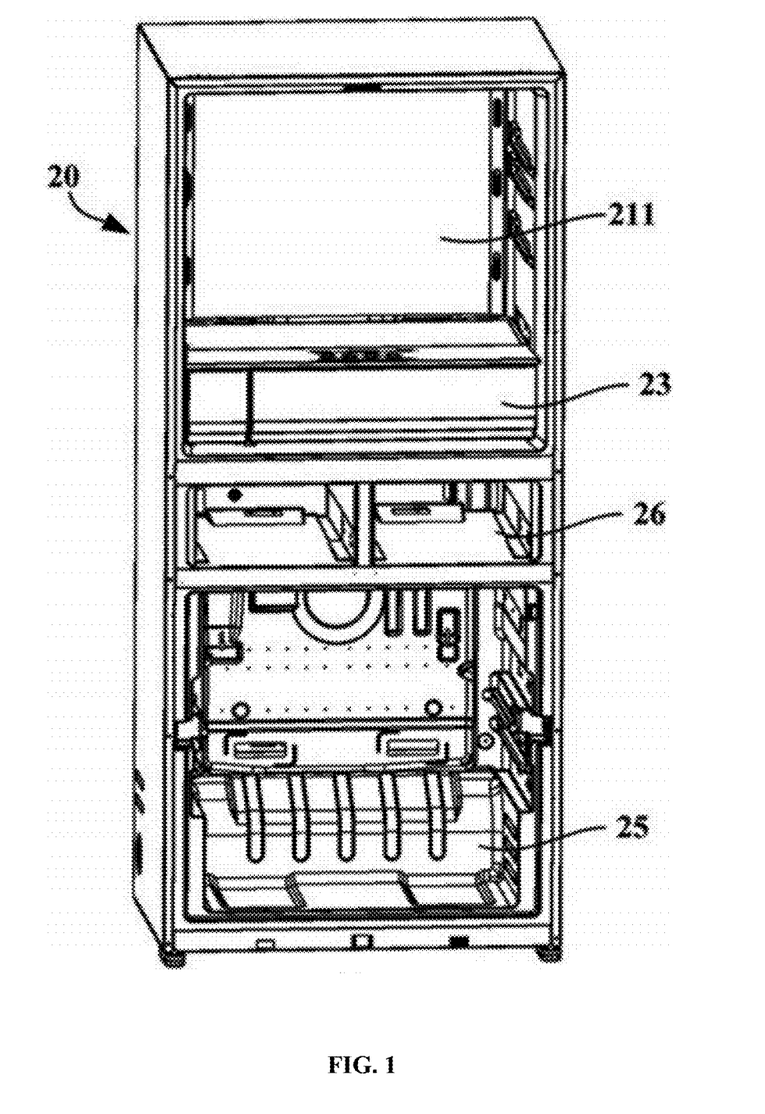
FIG. 1 is a schematic local structural view of a refrigerating and freezing device according to one embodiment of the present invention.
Figure 2:
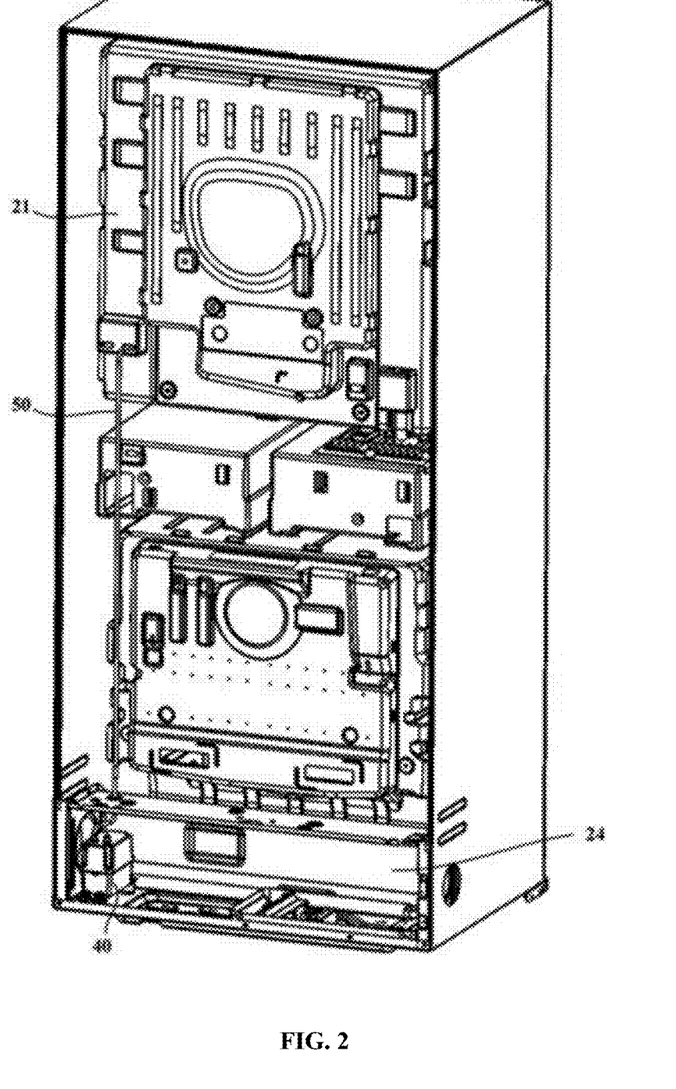
FIG. 2 is a schematic structural view of the structure shown in FIG. 1 from another perspective.

FIG. 1 is a schematic structural view of a refrigerating and freezing device according to one embodiment of the present invention. FIG. 2 is a schematic structural view of the structure shown in FIG. 1 from another perspective. As shown in FIG. 1 and FIG. 2, the embodiment of the present invention provides a refrigerating and freezing device, which may include a cabinet body 20, a main door body, a refrigerating system, an oxygen-enriched membrane assembly 30 and an air extractor 40.

A first storage space 211 is defined in the cabinet body 20. For example, the cabinet body 20 may include an inner container 21 with the first storage space 211 defined therein. The main door body may consist of two side-by-side door bodies which are rotatably mounted on the cabinet body 20 and configured to open or close the first storage space 211 defined in the cabinet body 20. Optionally, the main door body may also be one door body. Further, a storage container is disposed in the storage space 211. An atmosphere-controlled freshness-keeping space that may be a closed space or an approximately closed space is formed in the storage container. Preferably, the storage container is a drawer assembly and may include a barrel 22 and a drawer 23. The barrel 22 is disposed in the first storage space 211, and particularly, may be disposed at the lower portion of the first storage space 211. As recognized by those skilled in the field, the barrel 22 may also be disposed in the middle or at the upper portion of the first storage space 211. The drawer 23 may be slidably mounted in the barrel 22 to be operatively withdrawn from and inserted into the barrel 22 from a forward opening of the barrel 22. The drawer 23 may be provided with a drawer end cover that can cooperate with the opening of the barrel 22 to close the atmosphere-controlled freshness-keeping space. In some alternative embodiments, the storage container may include the barrel and a small door body configured to open or close the barrel.

The refrigerating system may be a compression-type refrigerating system, namely, a refrigerating circulation system including a compressor, a condenser, a throttling device, an evaporator, etc. The evaporator is configured to directly or indirectly supply cold into the first storage space 211. For example, when the refrigerating and freezing device is a household compression-type direct-cooling refrigerator, the evaporator may be disposed on the outer side or the inner side of a rear wall surface of the inner container 21. When the refrigerating and freezing device is a household compression-type air-cooling refrigerator, an evaporator room with an evaporator disposed therein is formed in the cabinet body 20 and communicated with the first storage space 211 through an air path system. A fan is disposed at an outlet of the evaporator room to perform circulatory refrigeration for the first storage space 211. In some alternative embodiments, the refrigerating system may be other types of refrigerating systems, for example, a semiconductor refrigerating device.

The oxygen-enriched membrane assembly 30 is provided with at least one oxygen-enriched membrane 31 and an oxygen-enriched gas collection chamber. The space around the oxygen-enriched membrane assembly 30 is communicated with the atmosphere-controlled freshness-keeping space. The oxygen-enriched membrane assembly 30 is configured such that more of oxygen than nitrogen in airflow in the space around the oxygen-enriched membrane assembly 30 enters the oxygen-enriched gas collection chamber through the oxygen-enriched membrane 31. In particular, an inner side surface of each oxygen-enriched membrane 31 faces the oxygen-enriched gas collection chamber, such that when the pressure of the oxygen-enriched gas collection chamber is lower than the pressure of the space around the oxygen-enriched membrane assembly 30, more of oxygen than nitrogen in air in an external space of the oxygen-enriched membrane assembly 30 enters the oxygen-enriched gas collection chamber through the at least one oxygen-enriched membrane 31.

The air extractor 40 is communicated with the oxygen-enriched gas collection chamber of the oxygen-enriched membrane assembly 30 through a pipeline 50 to extract and discharge the gas that permeates into the oxygen-enriched gas collection chamber out of the storage container.

In this embodiment, the air extractor 40 is controlled to extract air outwards, such that the pressure of the oxygen-enriched gas collection chamber may be lower than that of the space around the oxygen-enriched membrane assembly 30. Further, oxygen in the space around the oxygen-enriched membrane assembly 30 may enter the oxygen-enriched gas collection chamber. Since the atmosphere-controlled freshness-keeping space is communicated with the space around the oxygen-enriched membrane assembly 30, air in the atmosphere-controlled freshness-keeping space will enter the space around the oxygen-enriched membrane assembly 30. Thus, oxygen in air inside the atmosphere-controlled freshness-keeping space may also enter the oxygen-enriched gas collection chamber. Hence, a nitrogen-rich oxygen-lean gas atmosphere which facilitates freshness keeping of food is obtained in the atmosphere-controlled freshness-keeping space.

According to the refrigerating and freezing device provided by the present invention, the nitrogen-rich oxygen-lean gas atmosphere which facilitates freshness keeping of food may be formed in the atmosphere-controlled freshness-keeping space. In this gas atmosphere, the aerobic respiration intensity of fruits and vegetables is reduced by reducing the content of oxygen in a fruit and vegetable storage space. Meanwhile, a basic respiration function is guaranteed to prevent the fruits and vegetables from anaerobic respiration. Thus, the fruits and vegetables are kept fresh for a long time. Besides, since lots of such gases as nitrogen exist in the gas atmosphere, the refrigerating efficiency of articles in the atmosphere-controlled freshness-keeping space will not be reduced and thus the fruits and vegetables may be effectively stored. Moreover, the demands on the rigidity and the strength of the storage container and the like are relatively lower. Thus the implementation demand and cost are very low. The refrigerating and freezing device well solves the technical problem that those skilled in the field of atmosphere-controlled freshness-keeping have been eager to solve but has not successfully solved. The refrigerating and freezing device provided by the present invention is not only small in size but also low in noise, and therefore, is particularly suitable for family and individual use.

In some embodiments of the present invention, a plurality of micropores may be formed in the barrel 22. The first storage space 211 and the atmosphere-controlled freshness-keeping space are communicated via the plurality of micropores which may also be called air-pressure balancing holes. Each micropore may be a millimeter-level micropore. For example, each micropore has a diameter of 0.1-3 mm, preferably, 1 mm, 1.5 mm, etc. The plurality of micropores is formed to enable pressure in the atmosphere-controlled freshness-keeping space to be not too low. Besides, since the plurality of micropores is formed, nitrogen in the atmosphere-controlled freshness-keeping space will not flow to the first storage space 211, even if it flows, the flow is small or even negligible, which will not adversely affect preservation of food in the atmosphere-controlled freshness-keeping space. In some optional embodiments of the present invention, a micropore may not be formed in the barrel 22. Even so, lots of such gases as nitrogen still exist in the atmosphere-controlled freshness-keeping space. When a user pulls open the drawer 23, it does not take too much effort, which is much less laborious than a conventional vacuum storage compartment.

Figure 3:
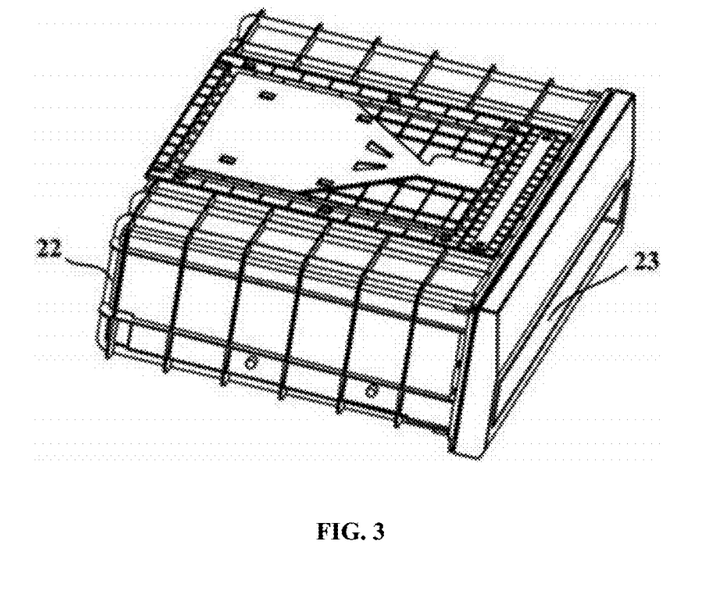
FIG. 3 is a schematic local structural view of a refrigerating and freezing device according to another embodiment of the present invention.
Figure 4:
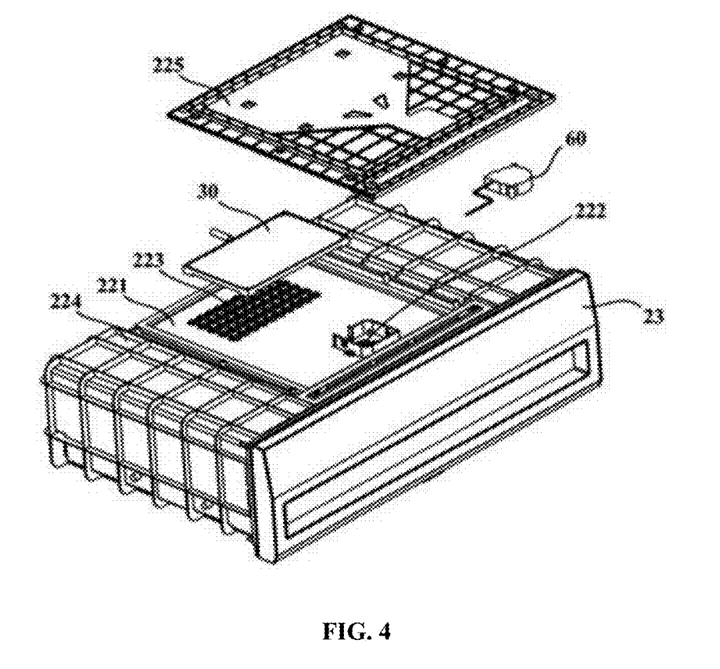
FIG. 4 is a schematic exploded view of the structure shown in FIG. 3.

In some embodiments of the present invention, as shown in FIG. 3 and FIG. 4, the oxygen-enriched membrane assembly 30 may be disposed on a barrel wall of the barrel 22. For example, the oxygen-enriched membrane assembly 30 may be shaped like a flat plate, and may be preferably and horizontally disposed at the top wall of the barrel 22. In particular, a receiving chamber 221 communicated with the atmosphere-controlled freshness-keeping space is formed in the top wall of the barrel 22. A first vent 222 and a second vent 223 which are communicated with the receiving chamber 221 are formed in an inner surface of the top wall of the barrel 22. The oxygen-enriched membrane assembly 30 is disposed in the receiving chamber 221. At least one first vent 222 and at least one second vent 223 which are spaced from each other are formed in a wall surface, between the receiving chamber 22 and the atmosphere-controlled freshness-keeping space, of the top wall of the barrel to respectively communicate the receiving chamber with the atmosphere-controlled freshness-keeping space in different positions. In some alternative embodiments, a sunken groove is formed in the inner side of the top wall of the barrel 22. The oxygen-enriched membrane assembly 30 is disposed in the sunken groove of the top wall of the barrel 22.

In some embodiments of the present invention, to promote gas circulation between the atmosphere-controlled freshness-keeping space and the receiving chamber 221, the refrigerating and freezing device may further include a fan 60. The fan 60 may be disposed in the receiving chamber and configured to enable the gas in the atmosphere-controlled freshness-keeping space to enter the receiving chamber 221 through the first vent 222 and to enable the gas in the receiving chamber 221 to enter the atmosphere-controlled freshness-keeping space through the second vent 223. That is, the fan 60 can enable the gas in the atmosphere-controlled freshness-keeping space to sequentially pass through the at least one first vent 222, the receiving chamber 221 and at least one second vent 223 and then to return to the atmosphere-controlled freshness-keeping space.

The fan 60 is preferably a centrifugal fan disposed at the first vent 222 in the receiving chamber 221. That is, the centrifugal fan is located above the at least one first vent 222, and has a vertically downward rotation axis, an air inlet right facing the first vent 222 and an air outlet that may face the oxygen-enriched membrane assembly 30. The oxygen-enriched membrane assembly 30 is disposed above the at least one second vent 223. Each oxygen-enriched membrane of the oxygen-enriched membrane assembly 30 is parallel to the top wall of the barrel 22. At least one first vent 222 is formed in the front portion of the top wall. At least one second vent 223 is formed in the rear portion of the top wall. That is, the centrifugal fan is disclosed at the front portion of the receiving chamber. The oxygen-enriched membrane assembly 30 is disposed at the rear portion of the receiving chamber 221.

Further, the top wall of the barrel 22 includes a main plate portion 224 and a cover plate portion 225. A sunken portion is formed in a local region of the main plate portion 224. The cover plate portion 225 detachably covers the sunken portion to form the receiving chamber 221. To facilitate manufacture of the barrel 22, the main plate portion 224 may be integrally formed with a side wall, a bottom wall and a rear wall of the barrel 22.

Figure 5:
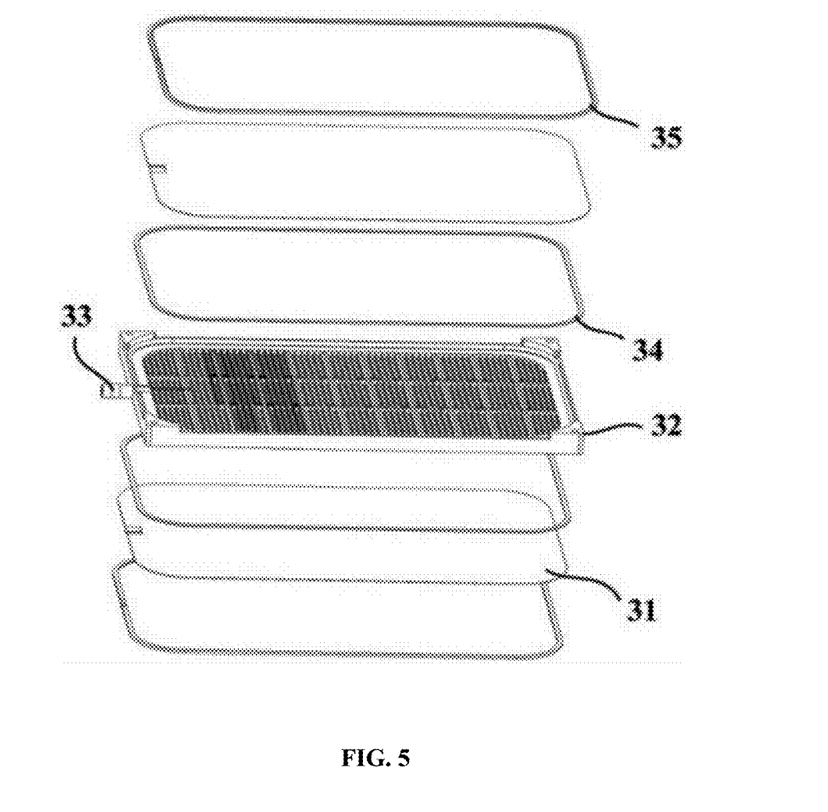
FIG. 5 is an exploded view of an oxygen-enriched membrane assembly in a refrigerating and freezing device according to one embodiment of the present invention.

In some embodiments of the present invention, as shown in FIG. 5, the oxygen-enriched membrane assembly 30 may be shaped like a flat plate. The oxygen-enriched membrane assembly 30 may further include a support frame 32. There may be two oxygen-enriched membranes 31 mounted on two sides of the support frame 32, such that the two oxygen-enriched membranes 31 and the support frame 32 together define the oxygen-enriched gas collection chamber. Further, the support frame 32 may include a side frame, and a ribbed plate and/or a flat plate and other structures that are disposed in the side frame. An airflow channel may be formed between the ribbed plates, as well as between the ribbed plates and the flat plate. Grooves may be formed in the surfaces of the ribbed plate and the flat plate to form the airflow channels. The ribbed plate/the flat plate can improve the structural strength and the like of the oxygen-enriched membrane assembly 30. That is, the support frame 32 is provided with a first surface and a second surface which are parallel to each other. A plurality of airflow channels which respectively extends on the first surface and the second surface and runs through the support frame 32 to communicate the first surface with the second surface is formed on the support frame 32. The plurality of airflow channels together forms the oxygen-enriched gas collection chamber. The at least one oxygen-enriched membrane 31 consists of two planar oxygen-enriched membranes which are respectively laid on the first surface and the second surface of the support frame 32.

In some embodiments of the present invention, the support frame 32 includes an air extraction hole 33 communicated with the at least one airflow channel and formed in the side frame to allow oxygen in the oxygen-enriched gas collection chamber to be output. The air extraction hole 33 is communicated with the air extractor 40. An outlet of the air extraction hole 33 serves as an exhaust opening of the oxygen-enriched membrane assembly 30. In particular, the air extraction hole 33 may be formed in a long edge of the side frame or in a short edge of the side frame, which is determined by the disposing direction or the actual design requirement of the oxygen-enriched membrane assembly 30. For example, in the embodiments shown in FIG. 3 and FIG. 4, the air extraction hole 33 may be formed in the long edge of the side frame. The oxygen-enriched membrane 31 is firstly mounted on the side frame through a double-faced adhesive tape, and then sealed by a sealant 35.

In some embodiments, the at least one airflow channel formed in the support frame 32 may be one or more cavities communicated with the air extraction hole 33. In some embodiments, the at least one airflow channel formed in the support frame 32 may be of a grid structure. In particular, the support frame 32 may include a side frame, a plurality of first ribbed plates and a plurality of second ribbed plates. The plurality of first ribbed plates is longitudinally disposed inside the border at intervals and extends transversely. One side surfaces of the plurality of first ribbed plates form the first surface. The plurality of second ribbed plates is transversely disposed at intervals on the other side surfaces of the plurality of first ribbed plates and extends longitudinally. One side surfaces, away from the first ribbed plates, of the plurality of second ribbed plates form the second surface. Since the plurality of first ribbed plates which is spaced longitudinally and extends transversely is disposed inside the side frame of the support frame 32, and the plurality of second ribbed plates which is spaced transversely and extends longitudinally is disposed on one side surfaces of the plurality of first ribbed plates, on one hand, the continuity of the airflow channel is guaranteed, and on the other hand, the size of the support frame 32 is greatly reduced, and the strength of the support frame 32 is greatly enhanced. Besides, owing to the above structure of the support frame 32, the oxygen-enriched membrane 31 can obtain sufficient support and maintain better flatness all the time even if negative pressure inside the oxygen-enriched gas collection chamber is relatively higher. Thus, the long service life of the oxygen-enriched membrane assembly 30 is guaranteed.

In a further embodiment, the plurality of first ribbed plates may include a plurality of first narrow ribbed plates and a plurality of first wide ribbed plates. The plurality of first wide ribbed plates is disposed at intervals. A plurality of first narrow ribbed plates is disposed between every two adjacent first wide ribbed plates. The plurality of second ribbed plates may include a plurality of second narrow ribbed plates and a plurality of second wide ribbed plates. The plurality of second wide ribbed plates is disposed at intervals. A plurality of second narrow ribbed plates is disposed between every two adjacent second wide ribbed plates. It is easily understood by those skilled in the field that the terms "wide" and "narrow" herein are relative to each other.

In some embodiments, each first wide ribbed plate sinks inwards from the side surface, which forms the first surface, to form a first trench. Each second wide ribbed plate sinks inwards from the side surface, which forms the second surface, to form a second trench. Thus, the communication of the inside grid structure of the support frame is improved on the premise of guaranteeing that the support frame 32 has a very small thickness (or a very small size).

In a further embodiment, a partial surface, away from the first surface, of each first wide ribbed plate extends toward the second ribbed plate to be flush with the second surface. Each first wide ribbed plate sinks inwards from the partial surface, which is flush with the second surface, to form a third trench. Crossed portions of the third trench and the second trench are communicated to form a cross-shaped trench. A partial surface, away from the second surface, of at least one of the plurality of second wide ribbed plates extends toward the first ribbed plate to be flush with the first surface. At least one of the plurality of second wide ribbed plates sinks inwards from the partial surface, which is flush with the first surface, to form a fourth trench. Crossed portions of the fourth trench and the first trench are communicated to form a cross-shaped trench.

In some embodiments of the present invention, to facilitate air circulation, an inner surface of the cover plate portion 225 may extend downwards to form a plurality of air-guide ribbed plates so as to guide airflow from the fan 60 to flow through, in the receiving chamber, the outer side surface, away from the oxygen-enriched gas collection chamber, of each oxygen-enriched membrane 31 of the oxygen-enriched membrane assembly 30. The plurality of air-guide ribbed plates may be divided into two groups, namely a first group of air-guide ribbed plates and a second group of air-guide ribbed plates which are symmetrical with the first group of air-guide ribbed plates. Each group of air-guide ribbed plates includes a first air-guide ribbed plate, at least one second air-guide ribbed plate and at least one third air-guide ribbed plate. The first air-guide ribbed plate extends toward one side of the receiving chamber from the air outlet of the centrifugal fan to one transverse outer side of the oxygen-enriched membrane assembly 30. Each second air-guide ribbed plate is disposed between the two first air-guide ribbed plates and located between the oxygen-enriched membrane assembly 30 and the centrifugal fan. Each third air-guide ribbed plate is located on one transverse outer side of the oxygen-enriched membrane assembly 30. Thus, airflow is guided to enter a gap between the oxygen-enriched membrane assembly 30 and a bottom surface or a top surface of the receiving chamber from two transverse sides of the oxygen-enriched membrane assembly 30.

In some embodiments of the present invention, a second storage space 25 and at least one third storage space 26 are further defined in the cabinet body 20. The second storage space 25 is disposed below the first storage space 211. The at least one third storage space 26 is disposed between the first storage space 211 and the second storage space 25. Preferably, the first storage space 211 is a refrigerating chamber of which the storage temperature is generally 2-10° C., preferably 3-8° C. The second storage space 25 may be a freezing chamber in which the temperature generally ranges from −14° C. to −22° C. The third storage space 26 may be a variable-temperature chamber of which the temperature can be adjusted as required to store appropriate food. Besides, there are two third storage spaces 26 which are flush with each other in a horizontal direction. In some alternative embodiments of the present invention, the first storage space 211 may also be a freezing chamber or a variable-temperature chamber. That is, the temperature range of the first storage space 211 may be controlled from −14° C. to −22° C. or adjusted as required. Further, relative positions of the first storage space, the second storage space and the third storage space can be adjusted according to actual demands.

In some embodiments of the present invention, as shown in FIG. 2, the refrigerating system may be a compression-type refrigerating system. A compressor compartment 24 is further defined in the cabinet body 20, and is preferably disposed behind and below the second storage space 25. Preferably, the air extractor 40 may be disposed inside the compressor compartment 24. In particular, the compressor compartment 24 extends in a transverse direction of the cabinet body 20. The air extractor 40 is disposed at one transverse end of the compressor compartment 24. A compressor may be disposed at the other transverse end of the compressor compartment 24, such that the air extractor 40 is relatively farther from the compressor. Thus, noise superposition and waste heat superposition are reduced. In some other embodiments of the present invention, the air extractor 40 is disposed close to the compressor, disposed at one end of the compressor compartment 24, and located between the compressor and a side wall of the compressor compartment 24.

The air extractor 40 may include an air pump, a mounting baseplate and a sealed box. The mounting baseplate may be mounted on a bottom surface of the compressor compartment 24 through a plurality of vibration-damping footpads. The sealed box with the air pump mounted therein is mounted on the mounting baseplate. An extraction opening of the air pump is communicated with an exhaust opening of the oxygen-enriched gas collection chamber through the pipeline 50. When the air pump is in operation, the sealed box can prevent noise and/or waste heat from spreading out to a great extent. Further, a mounting frame is disposed in the sealed box and connected to the inner wall of the sealed box through a plurality of vibration-damping pads. The air pump is secured inside the mounting frame, such that vibration and noise generated during running of the air pump are reduced. In particular, two vibration-damping pads are disposed at the bottom of the mounting frame and sleeve a positioning pillar on a bottom surface of the sealed box. A circular vibration-damping block is disposed on each of two opposite sides of the mounting frame and clamped in a clamping groove in a corresponding side wall of the sealed box. A vibration-damping block is secured to each of other two opposite sides of the mounting frame. The air pump may be located among the vibration-damping blocks inside the sealed box and is fastened onto the mounting frame through screws.

The pipeline 50 may include a vertical pipe segment disposed behind the first storage space 211. The vertical pipe segment has the lower end communicated with an inlet of the air extractor 40 and the upper portion communicated with the oxygen-enriched gas collection chamber of the oxygen-enriched membrane assembly 30. The vertical pipe segment may be disposed close to a side shell and a back plate inside the cabinet body 20. A thermal insulation sleeve or a thermal insulation pipe may sleeve the vertical pipe segment, such that the cold inside the vertical pipe segment can be prevented from being transferred to the side shell and the back plate. Thus, condensation can be avoided.

In some embodiments of the present invention, a locking device, a handle and a handle positioning device are disposed between the drawer 23 and the barrel 22. The locking device includes pivotal lock catches disposed on two sides of the drawer end cover, two buckling portions disposed on the barrel 22 and a clamping promotion device. Each buckling portion may be a bulge. The clamping promotion device may be configured to enable the two pivotal lock catches to rotate in the directions (namely, their respective first directions) to be engaged with their corresponding buckling portions. The handle extends horizontally and may be mounted on the drawer end cover slidably in a vertical direction. Besides, when the drawer 23 is in a closed state, the location of the handle may be an initial position of the handle. In addition, the handle is configured in the way that its two ends are respectively in contact with and propped against the two pivotal lock catches when in its initial position, such that each pivotal lock catch is prevented from rotating in another direction that is opposite to the corresponding first direction, and the pivotal lock catches and the buckling portions are kept in a cooperative state. Thus, the drawer 23 is locked to the barrel 22. Further, when the handle is moved upwards or downwards to a locking removal position, that is, after the handle is moved from the initial position to the locking removal position, each pivotal lock catch may be allowed to rotate in another direction that is opposite to the corresponding first direction, such that the pivotal lock catches are allowed to rotate to be disengaged from the corresponding buckling portions when the drawer 23 is pulled outwards. Thus, the drawer 23 is allowed to be opened. The handle positioning device is configured to keep the handle in the positions, mainly including the initial position and the locking removal position, after the handle moves to each predetermined position. When the drawer is opened, a user moves the handle upwards or downwards to the locking removal position. The handle positioning device keeps the handle in this position. Then, the user can pull open the drawer 23 outwards. When the drawer is closed, the user closes the drawer 23 first and then moves the handle downwards or upwards to the initial position. The handle positioning device keeps the handle in this position. Thus, the drawer 23 and the barrel 22 are kept in a locking state.

To further ensure stable movement of the handle, a guide rod and a slider are respectively disposed at two ends of the handle. The guide rod extends in a vertical direction. The drawer 23 further includes two groups of slideways. Each group of slideways is provided with at least three chutes which extend in a vertical direction, such that two chutes are respectively disposed on two sides of the guide rod, and the slider moves on the remaining chute. Or, two chutes are respectively disposed on two sides of the slider, and the guide rod moves on the remaining chute. For example, each group of slideways may include four chutes, two of which are respectively disposed on the front side and the rear side of the guide rod, and the other two of which are respectively disposed on two transverse sides (namely the left side and the right side) of the slider.

So far, those skilled in the art should realize that although the present description illustrates and describes various exemplary embodiments of the present invention, many other variations or modifications conforming to the principle of the present invention can be determined directly or derived based on the content disclosed by the present invention without departing from the spirit and scope of the present invention. Therefore, the scope of the present invention should be understood and considered to have covered all these variations or modifications.

What is claimed is:

1. A refrigerating and freezing device, comprising:
    a cabinet body with a first storage space defined therein, wherein a storage container in which an atmosphere-controlled freshness-keeping space is formed is disposed in the first storage space, wherein the storage container is a drawer assembly which comprises a barrel disposed in the first storage space and a drawer slidably mounted in the barrel to be operatively withdrawn from and inserted into the barrel from a forward opening of the barrel;
    an oxygen-enriched membrane assembly having at least one oxygen-enriched membrane and an oxygen-enriched gas collection chamber, wherein the space around the oxygen-enriched membrane assembly is communicated with the atmosphere-controlled freshness-keeping space, and the oxygen-enriched membrane assembly is configured such that more of oxygen than nitrogen in airflow in the space around the oxygen-enriched membrane assembly enters the oxygen-enriched gas collection chamber through the oxygen-enriched membrane, wherein a receiving chamber communicated with the atmosphere-controlled freshness-keeping space is formed in a top wall of the barrel; and the oxygen-enriched membrane assembly is disposed in the receiving chamber; and
    an air extractor communicated with the oxygen-enriched gas collection chamber through a pipeline to extract and discharge the gas that permeates into the oxygen-enriched gas collection chamber out of the storage container.

2. The refrigerating and freezing device according to claim 1, wherein:
    at least one first vent and at least one second vent spaced from the at least one first vent are formed in a wall surface, between the receiving chamber and the atmosphere-controlled freshness-keeping space, of the top wall to respectively communicate the receiving chamber with the atmosphere-controlled freshness-keeping space in different positions; and
    the refrigerating and freezing device further comprises a fan, wherein the fan is disposed in the receiving chamber to enable the gas in the atmosphere-controlled freshness-keeping space to sequentially pass through the at least one first vent, the receiving chamber and the at least one second vent and then to return to the atmosphere-controlled freshness-keeping space.

3. The refrigerating and freezing device according to claim 2, wherein:
    the fan is a centrifugal fan disposed above the at least one first vent, and a rotation axis of the centrifugal fan is vertically downward; and
    the oxygen-enriched membrane assembly is disposed above the at least one second vent, and each oxygen-enriched membrane of the oxygen-enriched membrane assembly is parallel to the top wall.

4. The refrigerating and freezing device according to claim 2, wherein:
    the at least one first vent is formed in the front portion of the top wall of the barrel, and the at least one second vent is formed in the rear portion of the top wall of the barrel.

5. The refrigerating and freezing device according to claim 1, wherein:
    the oxygen-enriched membrane assembly further comprises a support frame, the support frame is provided with a first surface and a second surface which are parallel to each other, a plurality of airflow channels which respectively extends on the first surface and the second surface and runs through the support frame to communicate the first surface with the second surface is formed on the support frame, and the plurality of airflow channels together forms the oxygen-enriched gas collection chamber; and
    the at least one oxygen-enriched membrane comprises two planar oxygen-enriched membranes which are respectively laid on the first surface and the second surface of the support frame.

6. The refrigerating and freezing device according to claim 1, wherein:
the air extractor comprises a mounting baseplate and a sealed box mounted on the mounting baseplate, and an air pump disposed in the sealed box, wherein an extraction opening of the air pump is communicated with an exhaust opening of the oxygen-enriched gas collection chamber through the pipeline.

7. The refrigerating and freezing device according to claim 1, wherein:
a second storage space and at least one third storage space are further defined in the cabinet body; and
the second storage space is disposed below the first storage space, and the at least one third storage space is disposed between the first storage space and the second storage space.

8. The refrigerating and freezing device according to claim 7, wherein:
the first storage space is a refrigerating chamber;
the second storage space is a freezing chamber; and
the third storage space is a variable-temperature chamber, the number of the third storage spaces is two, and the two third storage spaces are flush with each other in a horizontal direction.

9. A refrigerating and freezing device, comprising:
a cabinet body with a first storage space defined therein, wherein a storage container in which an atmosphere-controlled freshness-keeping space is formed is disposed in the first storage space;
an oxygen-enriched membrane assembly having at least one oxygen-enriched membrane and an oxygen-enriched gas collection chamber, wherein the space around the oxygen-enriched membrane assembly is communicated with the atmosphere-controlled freshness-keeping space, and the oxygen-enriched membrane assembly is configured such that more of oxygen than nitrogen in airflow in the space around the oxygen-enriched membrane assembly enters the oxygen-enriched gas collection chamber through the oxygen-enriched membrane; and
an air extractor communicated with the oxygen-enriched gas collection chamber through a pipeline to extract and discharge the gas that permeates into the oxygen-enriched gas collection chamber out of the storage container;
wherein the oxygen-enriched membrane assembly further comprises a support frame, the support frame is provided with a first surface and a second surface which are parallel to each other, a plurality of airflow channels which respectively extends on the first surface and the second surface and runs through the support frame to communicate the first surface with the second surface is formed on the support frame, and the plurality of airflow channels together forms the oxygen-enriched gas collection chamber; and
the at least one oxygen-enriched membrane comprises two planar oxygen-enriched membranes which are respectively laid on the first surface and the second surface of the support frame.

10. A refrigerating and freezing device, comprising:
a cabinet body with a first storage space defined therein, wherein a storage container in which an atmosphere-controlled freshness-keeping space is formed is disposed in the first storage space;
an oxygen-enriched membrane assembly having at least one oxygen-enriched membrane and an oxygen-enriched gas collection chamber, wherein the space around the oxygen-enriched membrane assembly is communicated with the atmosphere-controlled freshness-keeping space, and the oxygen-enriched membrane assembly is configured such that more of oxygen than nitrogen in airflow in the space around the oxygen-enriched membrane assembly enters the oxygen-enriched gas collection chamber through the oxygen-enriched membrane; and
an air extractor communicated with the oxygen-enriched gas collection chamber through a pipeline to extract and discharge the gas that permeates into the oxygen-enriched gas collection chamber out of the storage container, wherein the air extractor comprises a mounting baseplate and a sealed box mounted on the mounting baseplate, and an air pump disposed in the sealed box, wherein an extraction opening of the air pump is communicated with an exhaust opening of the oxygen-enriched gas collection chamber through the pipeline.

* * * * *